US009746709B2

(12) United States Patent
Kim et al.

(10) Patent No.: US 9,746,709 B2
(45) Date of Patent: Aug. 29, 2017

(54) BACKLIGHT UNIT AND DISPLAY APPARATUS INCLUDING THE SAME

(71) Applicant: LG ELECTRONICS INC., Seoul (KR)

(72) Inventors: Geunhwan Kim, Seoul (KR); Jongho Han, Seoul (KR); Juyoung Joung, Seoul (KR); Wondo Kee, Seoul (KR); Minho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/819,842

(22) Filed: Aug. 6, 2015

(65) Prior Publication Data

US 2016/0231622 A1    Aug. 11, 2016

(30) Foreign Application Priority Data

Feb. 11, 2015    (KR) .......................... 10-2015-0021184

(51) Int. Cl.
    *G02F 1/1335*    (2006.01)
    *F21V 8/00*    (2006.01)

(52) U.S. Cl.
    CPC ..... *G02F 1/133553* (2013.01); *G02B 6/0021* (2013.01); *G02F 1/133526* (2013.01); *G02F 1/133615* (2013.01); *G02B 6/0036* (2013.01); *G02B 6/0046* (2013.01); *G02B 6/0058* (2013.01); *G02B 6/0096* (2013.01)

(58) Field of Classification Search
    CPC .............. G02B 6/003; G02F 1/133553; G02F 1/133526; G02F 1/133615
    See application file for complete search history.

(56) References Cited

U.S. PATENT DOCUMENTS

| 2008/0309849 | A1* | 12/2008 | Yang .................... G02B 6/0028 349/65 |
| 2009/0273743 | A1* | 11/2009 | Sawabe ............... G02F 1/13471 349/81 |
| 2009/0323372 | A1* | 12/2009 | Kurihara ................ G02B 6/002 362/620 |
| 2012/0008067 | A1 | 1/2012 | Mun et al. |
| 2013/0021779 | A1 | 1/2013 | Kim |
| 2013/0242541 | A1 | 9/2013 | Kim et al. |
| 2013/0301240 | A1* | 11/2013 | Liu ......................... F21V 13/04 362/97.1 |
| 2015/0109816 | A1* | 4/2015 | Yagi ..................... G02B 6/0023 362/606 |

FOREIGN PATENT DOCUMENTS

JP    2002-040420    2/2002

OTHER PUBLICATIONS

European Search Report dated Jun. 13, 2016.

\* cited by examiner

*Primary Examiner* — James Dudek
(74) *Attorney, Agent, or Firm* — KED & Associates, LLP

(57) ABSTRACT

Provided are a backlight unit and a display apparatus including the same. An optical lens of an optical unit has a shape asymmetrical with respect to a plane that bisectionally divides a center of an optical package. A plurality of reflectors each of which has an embossed or engraved shape are disposed on a top surface of the reflection sheet.

18 Claims, 18 Drawing Sheets

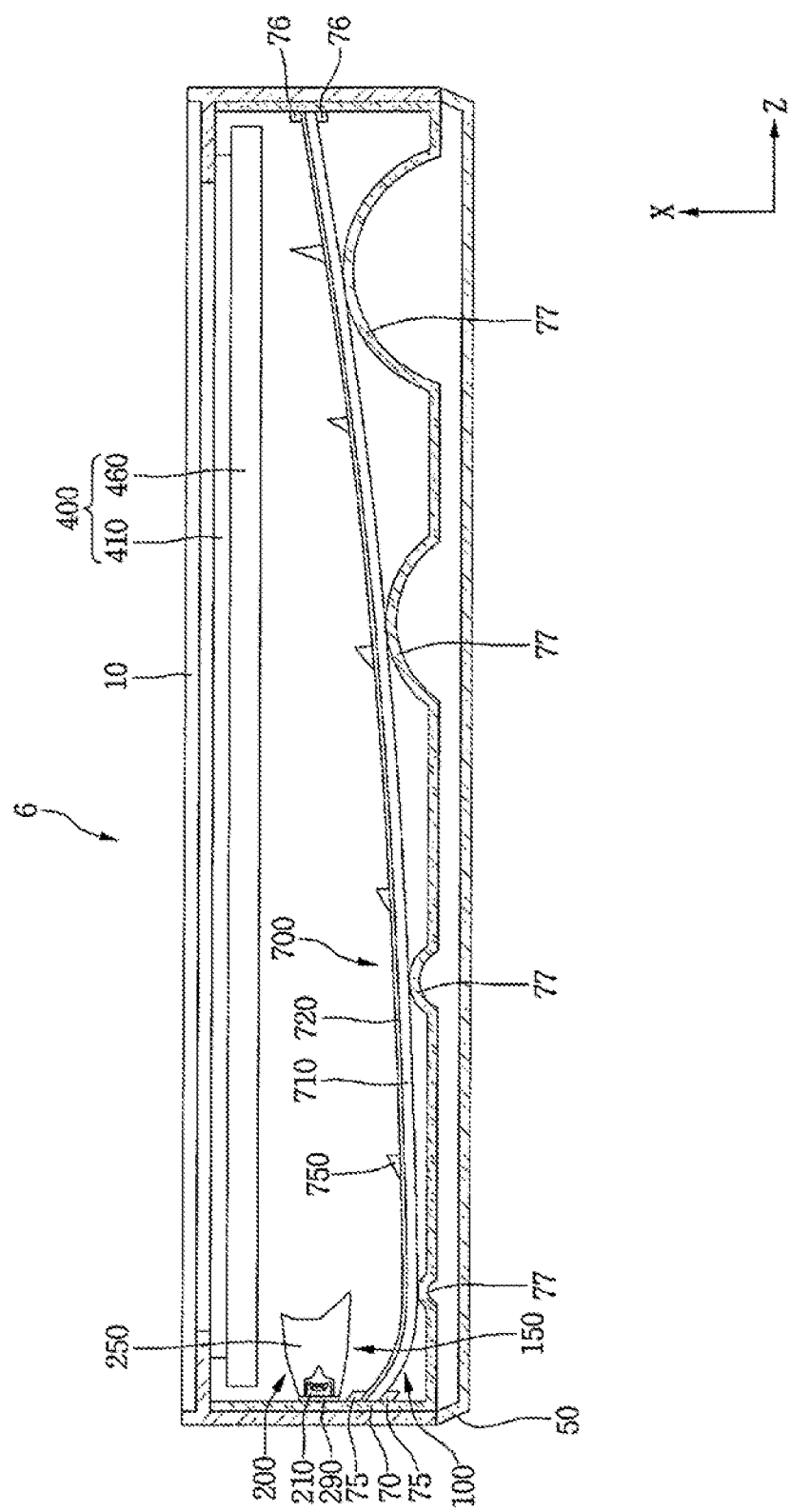

BACKLIGHT UNIT AND DISPLAY APPARATUS INCLUDING THE SAME

CROSS-REFERENCE TO RELATED APPLICATIONS

The present application claims the benefits of priority to Korean Patent Application No. 10-2015-0021184 filed on Feb. 11, 2015, which is herein incorporated by reference in its entirety.

BACKGROUND

1. Field

The present disclosure relates to a backlight unit and a display apparatus including the same.

2. Background

Display apparatuses may be apparatuses for visually displaying images such as televisions or monitors. In recent years, liquid crystal display apparatuses as flat panel displays form a majority in the market. Such a liquid crystal display apparatus includes a display panel and a backlight unit for providing light to the display panel.

The backlight unit may be classified into an edge type backlight unit and a direct type backlight unit according to a position of a light source unit that emits light. In the edge type backlight unit, a light source unit is disposed on a side surface of a rear side of the display panel, in the direct type backlight unit, a light source unit is disposed at a rear side of a display panel to face the display panel.

An edge type display apparatus according to the related art is disclosed in Korean Patent Publication No. 2013-0024018. In the edge type backlight unit, since the light source unit is disposed on the side surface, a light guide plate for inducing light emitted from the side surface to a front side of the display panel is provided. The light guide plate occupies a large volume within the display apparatus.

In recent years, various attempts for providing an edge type backlight unit from which a light guide plate is removed to realize slimness of a display apparatus in consideration of the latest slimness trend, so-called, an edge type display apparatus without a light guide plate are being carried out in liquid crystal display apparatus markets. However, when the light guide plate is removed from the edge type backlight unit, it may be difficult to realize optimum image quality.

Thus, an edge type backlight unit that is capable of realizing optimum image quality without providing the light guide plate by reflecting the latest slimness trend and a display apparatus including the same are required.

BRIEF DESCRIPTION OF THE DRAWINGS

FIG. 18 is a cross-sectional view of a display apparatus according to another embodiment.

DETAILED DESCRIPTION

A display apparatus includes a display panel for displaying an image to visually display the image. The display apparatus may include various apparatuses for displaying an image such as televisions, monitors, laptop PCs, Tablet PCs, Smartphones, personal digital assistants, E-book readers, electronic picture frames, kiosks, and the like. Hereinafter, the television will be described as an example of the display apparatus according to an embodiment.

Figure 1:
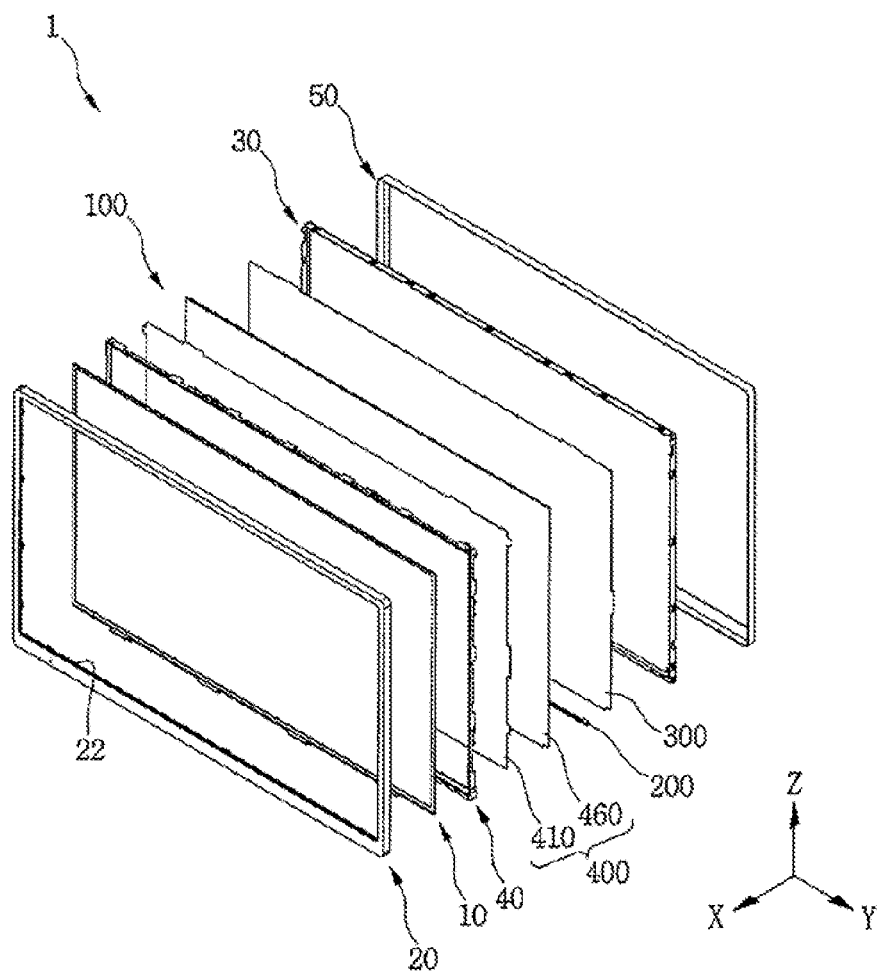
FIG. 1 is an exploded perspective view of a display apparatus according to an embodiment.
Figure 2:
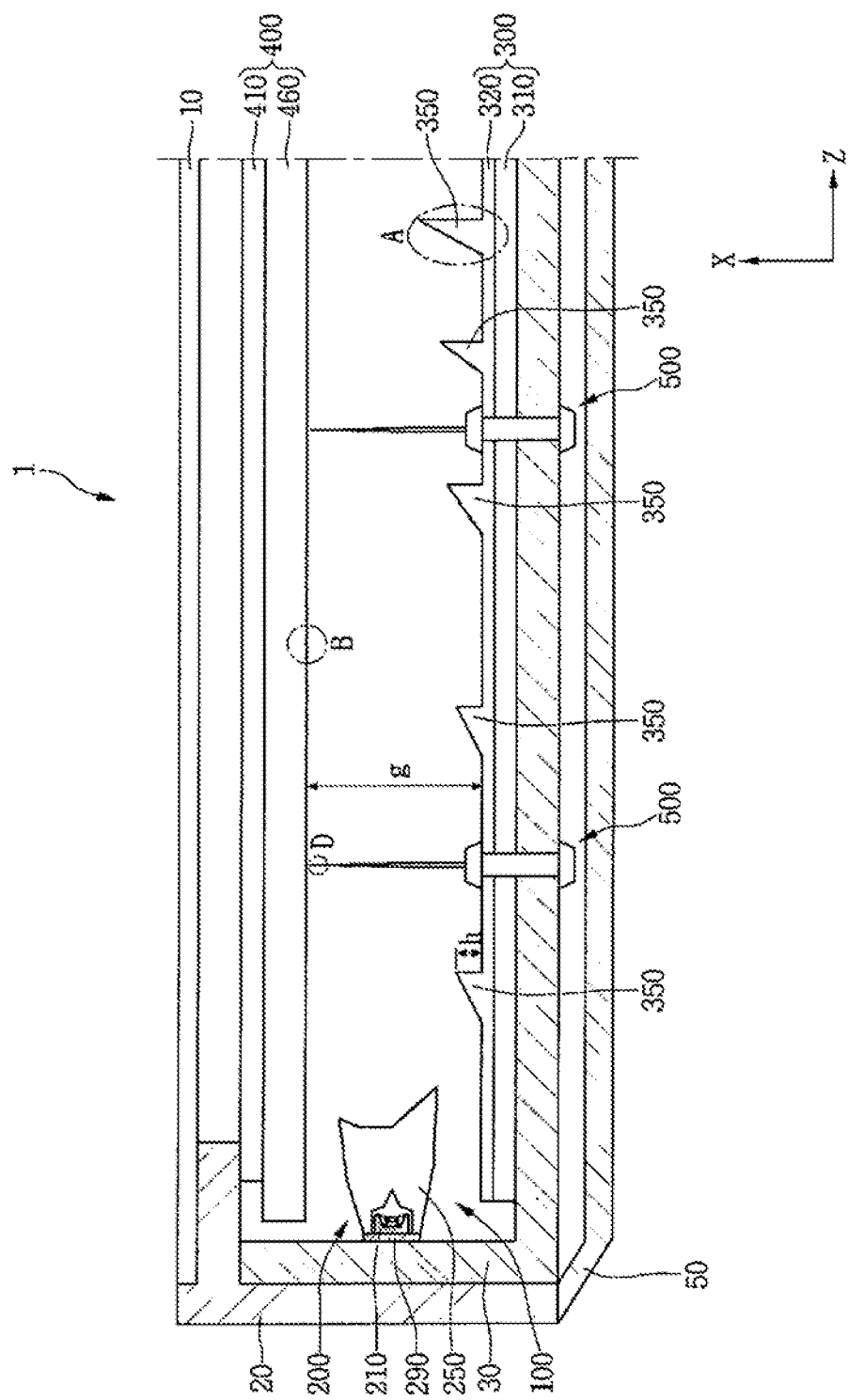
FIG. 2 is a cross-sectional view of the display apparatus of FIG. 1.
Figure 3:
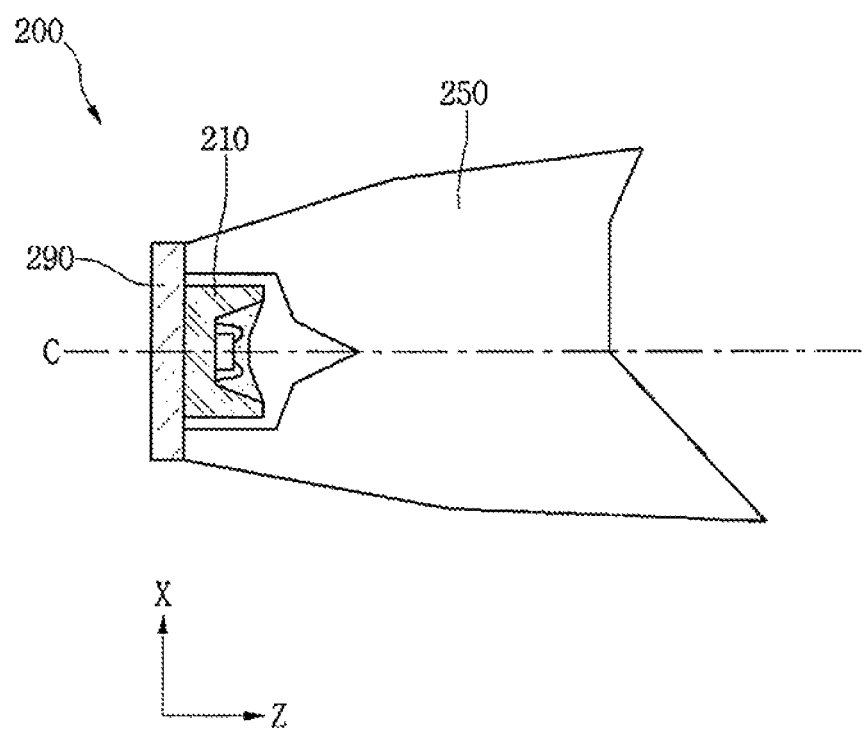
FIG. 3 is an enlarged view illustrating a light source unit of the display apparatus of FIG. 2.
Figure 4:
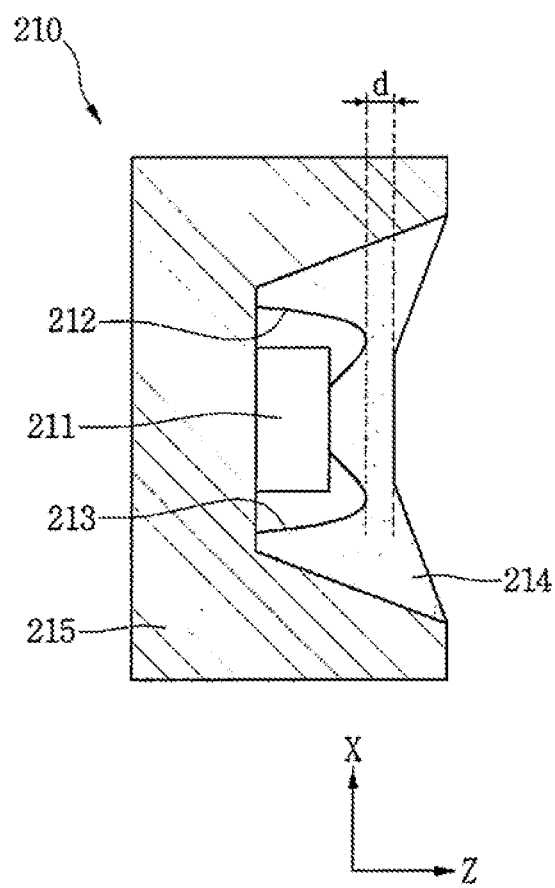
FIG. 4 is a cross-sectional view illustrating a light source package of the light source unit of FIG. 3.
Figure 5:
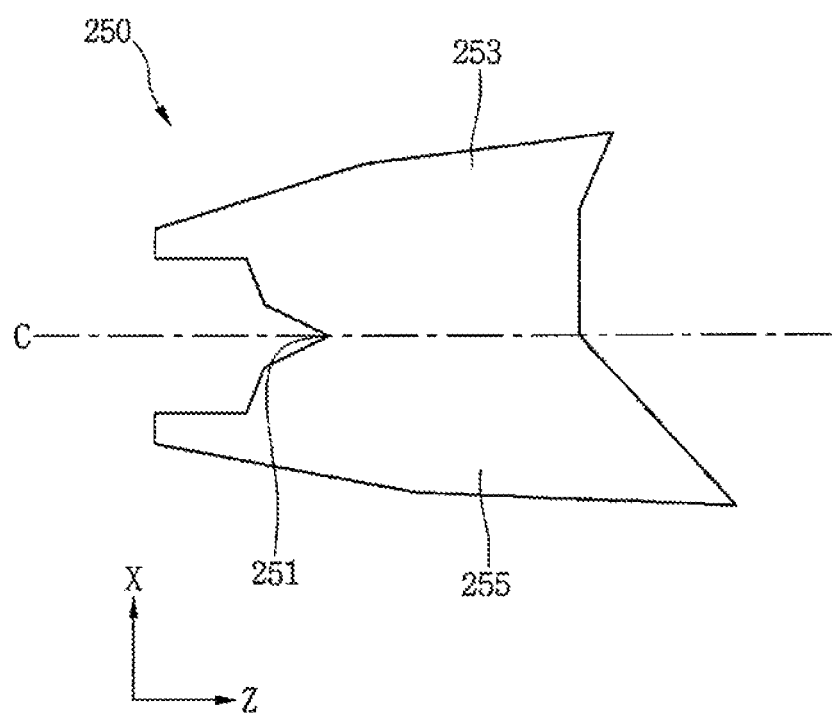
FIG. 5 is a cross-sectional view illustrating an optical lens of the light source unit of FIG. 3.
Figure 6:
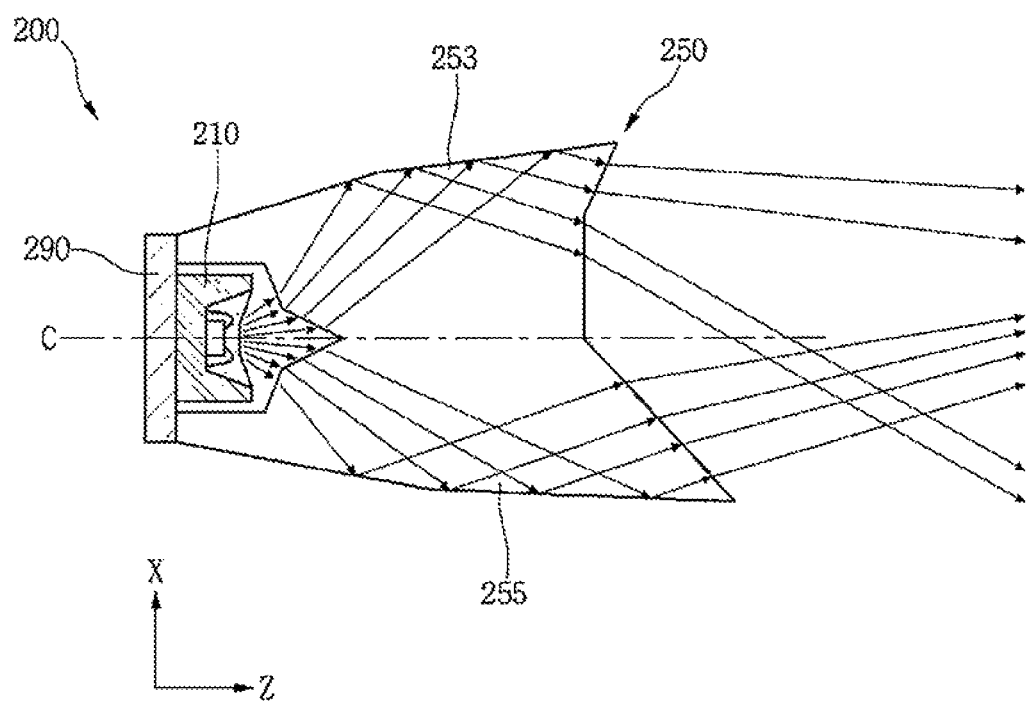
FIG. 6 is a view for explaining a light moving path of the light source unit of FIG. 3.
Figure 7:
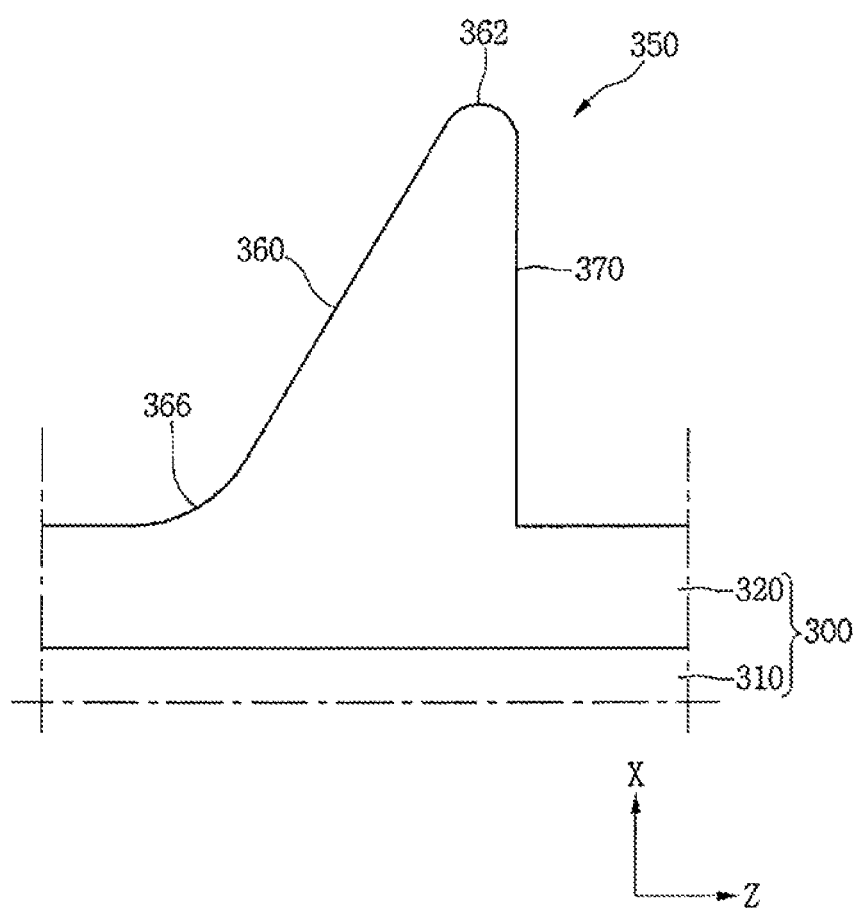
FIG. 7 is an enlarged view illustrating a portion A of the display apparatus of FIG. 2.
Figure 8:
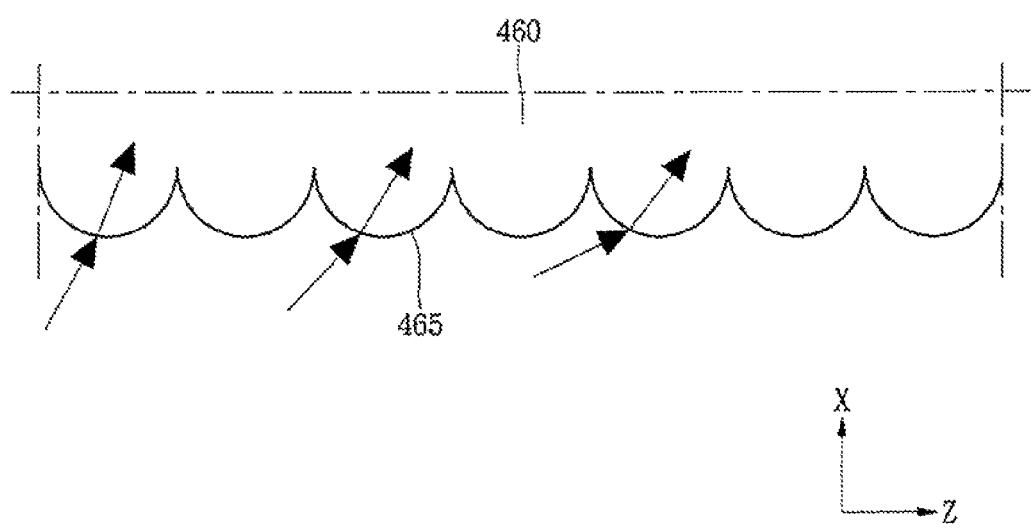
FIG. 8 is an enlarged view illustrating a portion B of the display apparatus of FIG. 2.
Figure 9:
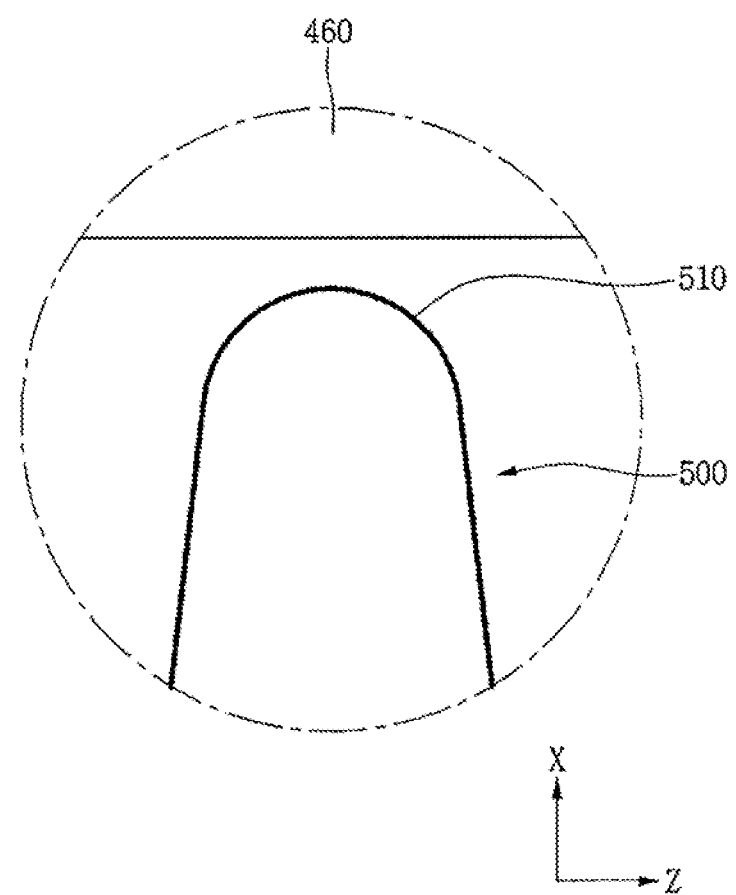
FIG. 9 is an enlarged view illustrating a portion B of the display apparatus of FIG. 2.
Figure 10:
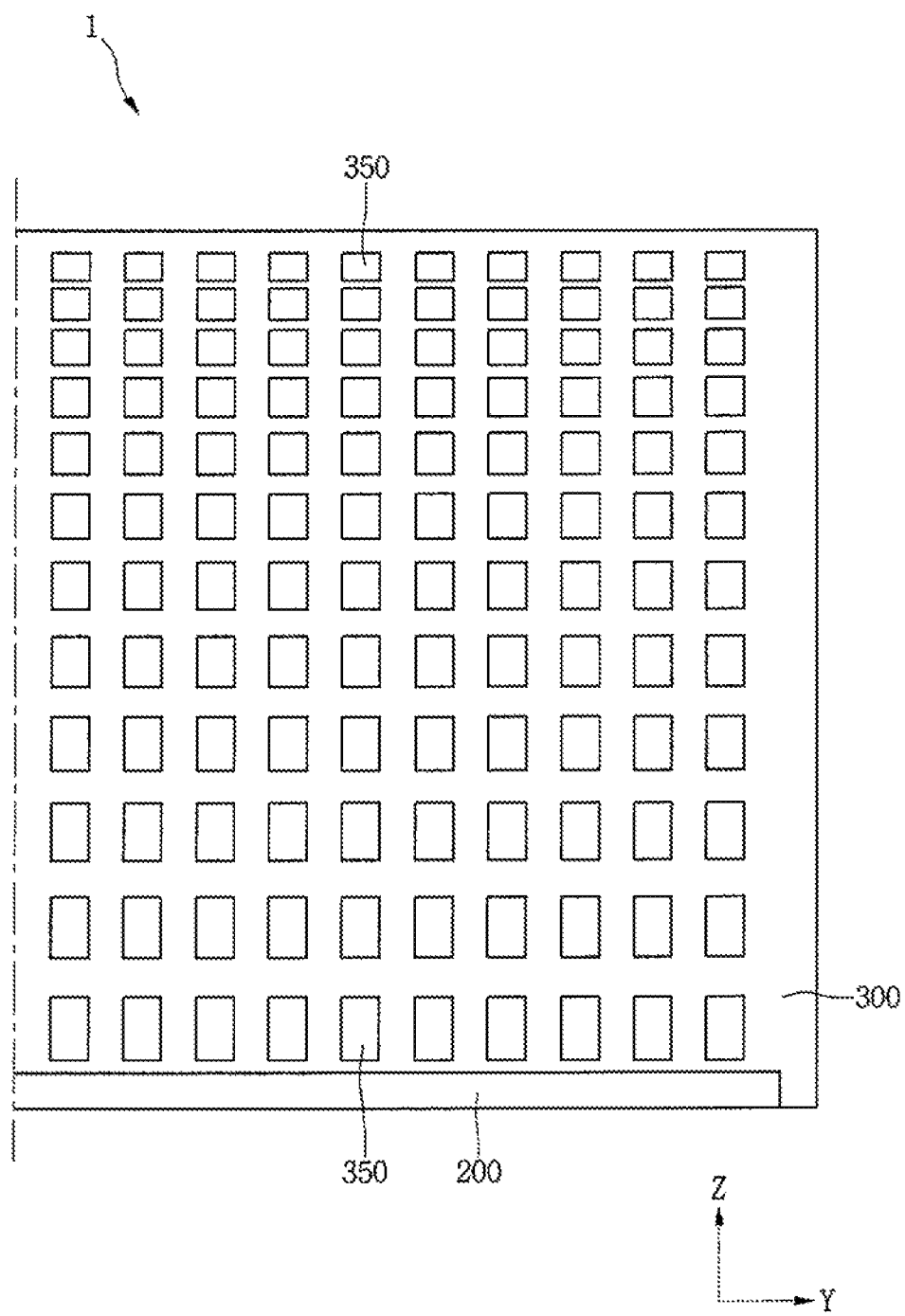
FIG. 10 is a plan view for explaining a main part of the display apparatus of FIG. 2.

FIG. 1 is an exploded perspective view of a display apparatus according to an embodiment, FIG. 2 is a cross-sectional view of the display apparatus of FIG. 1, FIG. 3 is an enlarged view illustrating a light source unit of the display apparatus of FIG. 2, FIG. 4 is a cross-sectional view illustrating a light source package of the light source unit of FIG. 3, FIG. 5 is a cross-sectional view illustrating an optical lens of the light source unit of FIG. 3, FIG. 6 is a view for explaining a light moving path of the light source unit of FIG. 3, FIG. 7 is an enlarged view illustrating a portion A of the display apparatus of FIG. 2, FIG. 8 is an enlarged view illustrating a portion B of the display apparatus of FIG. 2, FIG. 9 is an enlarged view illustrating a portion B of the display apparatus of FIG. 2, and FIG. 10 is a plan view for explaining a main part of the display apparatus of FIG. 2.

Referring to FIGS. 1 to 10, a display apparatus 1 according to an embodiment includes a display panel 10, a top cover 20, a bottom cover 30, a middle frame 40, a back cover 50, and a backlight unit 100.

The display panel 10 may display an image and be provided with a liquid crystal display panel. The top cover 20 is disposed at a front side of the display panel 10 and has an opening 22 through which an image displayed from the display panel 10 is output to the outside. The bottom cover 30 is disposed at a rear side of the display panel 10 and coupled to the top cover 20 while surrounding the display panel 10 and the backlight unit 100. Also, a power board (not shown) for supplying required power into the display apparatus 1 and a control board (not shown) for controlling an operation of the display apparatus 1 may be disposed on a rear side of the bottom cover 30.

The middle frame 40 may be a member for guiding the display panel 10 to be mounted on the bottom cover 100 and disposed between the top cover 20 and the bottom cover 30.

The middle frame 40 may be integrated with the top cover 20 or independently provided from the top cover 20.

The back cover 50 may be mounted on a rear side of the bottom cover 30 to define a rear outer appearance of the display apparatus 1. A stand for supporting the display apparatus 1 may be mounted on the back cover 50.

The backlight unit 100 may be a unit for providing light toward the display panel 10 so that an image is displayed on the display panel 10. The backlight unit 100 is disposed at a rear side of the display panel 10.

The backlight unit 100 may be classified into an edge type backlight unit in which a light source is disposed at a side surface of a rear side of the display panel 10 and a direct type backlight unit in which a light source is disposed at a rear side of a display panel to face the display panel according to an installation position of the light source that provides light. Hereinafter, the edge type backlight unit will be exemplified in the current embodiment.

The backlight unit 100 may include a light source unit 200, a reflection sheet 300, at least one optical sheet 400, and a support 500. The light source unit 200 may be a component for providing light onto the display panel 10. In the edge type backlight unit 100 according to the current embodiment, the light source unit 200 is disposed on one side surface of a rear side of the display panel 10. The light source unit 200 may include a light source package 210, an optical lens 250, and a light source board 290.

The light source package 210 may supply light onto the display panel and be mounted on a side surface of the bottom cover 30. The light source package 210 may be provided as one or as a plurality. Hereinafter, a structure in which the plurality of light source packages 210 are disposed at a predetermined distance on an inner circumferential surface of a side surface of the bottom cover 30 will be described as an example. The plurality of light source packages 210 may be mounted to be spaced a predetermined distance from each other on the light source board 290 that will be described below.

The light source package 210 may include a light source 211, a pair of wires 212 and 213, a phosphor 214, and a package frame 215. The light source 211 may be a device for generating light and may include a light emitting diode (LED). The pair of wires 212 and 213 may be components for electrically connecting the light source 211 to the light source board 290 that will be described later.

The phosphor 214 may convert light having a specific color, which is generated by the light source 211, into light having a different color (e.g., white color) that is adequate for use of the light source unit 200. An emission surface of the light source package 210 which is filled with the phosphor 214 may have a concave recessed shape. This is done for irradiating light emitted from the light source 211 toward an opposite side, i.e., in a direction (+Z axis direction) of a side surface that is opposite to the side surface of the display panel, on which the light source package 210 is disposed.

Furthermore, the emission surface may be spaced a predetermined distance d from the pair of wires 212 and 213 to an outer surface of the phosphor 214 in consideration of thermal contraction and expansion of the phosphor 214. If the phosphor 214 has too thin of a thickness, the light source 211 or the pair of wires 212 and 213 may be exposed to the outside of the light source package 210 by the thermal construction and expansion of the phosphor 214. To prevent the light source 211 or the pair of wires 212 and 213 from being exposed to the outside, a distance d between the pair of wires 212 and 213 and an outer surface of the phosphor 214 may be above at least 100 um.

The package frame 215 may be mounted on the light source board 290 to package the light source 211, the pair of wires 212 and 213, and the phosphor 214. The optical lens 250 may surround the light source package 210 at a front side (+Z axis direction) of the light source package 210. That is, a recess part for accommodating the light source package 210 may be defined in a bottom part of the optical lens 250. Thus, the optical lens 250 may be provided in number corresponding to the number of light source packages 210.

A surface 251 facing a central portion of the bottom surface of the optical lens 250, i.e., the emission surface of the light source package 210 may have a cone shape. This is done for irradiating light emitted from the light source 211 toward the most opposite side, i.e., in a direction (+Z axis direction) of a side surface that is opposite to the side surface of the display panel, on which the light source package 210 is disposed. However, this may be an example, and thus, the surface 251 may have various shapes.

The optical lens 250 may have an asymmetric shape with respect to a central axis C of the light source package 210. In another aspect of the embodiment, the optical lens 250 may have a vertically asymmetric shape with respect to a reference surface (or horizontal surface) that bisectionally divides the light source package 210. Here, a surface that bisectionally divides the light source package 210 may be parallel to the optical sheet 400.

The optical lens 250 may have an asymmetric section with respect to the central axis C penetrating the emission surface of the light source package 210 while passing through a center of the light source package 210. The asymmetric section will be described below in more detail. The optical lens 250 may include a first lens part 253 and a second lens part 255. The first lens part 253 is disposed in a direction (+X axis direction) that is close to the display panel 10 with respect to the central axis C of the light source package 210. The second lens part 255 extends from the first lens part 253 and is disposed in a direction (−X axis direction) that is close to the reflection sheet 300 with respect to the central axis C of the light source package 210.

That is to say, the first lens part 253 may be disposed at an upper side in a front direction (+Z axis direction) of the light source package 210, and the second lens part 255 may be disposed at a lower side in a front direction (+Z axis direction) of the light source package 210. Here, the +Z axis direction may represent a direction in which light emitted from the light source package 210 advances.

The second lens part 255 may further protrude form the central axis C of the light source package 210 in the front direction (+Z axis direction) of the light source package 210 when compared to the first lens part 253. Thus, a more amount of light passing through the first lens part 253 may be induced toward the reflection sheet 300 due to the above-described vertically asymmetric shape. In addition, light passing through the second lens part 255 may be induced to advance in the front direction (+Z axis direction) of the light source package 210. As a result, a more amount of light passing through the first lens part 253 may be induced toward the reflection sheet 300, and the reflection sheet 300 may effectively reflect the light induced by the first lens part 253 toward the display panel 10.

The light source board 290 is mounted on a side surface of the bottom cover 30 in the form of a printed circuit board (PCB) and is electrically connected to the control board. Also, a light source assembly constituted by the light source package 210 and the optical lens 250 may be mounted at a predetermined distance on the light source board 290.

The reflection sheet 300 may be mounted on the bottom of the bottom cover 30 to reflect the light emitted from the light source package 210 toward the display panel 10. The reflection sheet 300 may include a sheet base 310 and a reflection layer 320. The sheet base 310 may be fitted into the bottom surface of the bottom cover 30, adhered to the bottom surface, or fixed to the bottom surface by using a screw member and thus be mounted on the bottom surface of the bottom cover 30.

The reflection layer 320 is disposed on a top surface of the sheet base 310. The reflection layer 320 may be formed of a white resin having high reflectivity. The white resin may be a medium through which light does not pass, but is reflected, and may have high reflectivity. The reflection layer 320 formed of the white resin may be applied to a top surface of the sheet base 310.

At least one or a plurality of reflectors 350 may be disposed on the top surface of the reflection layer 320. The reflector 350 may guide the reflection of the light toward the display panel 10. The reflector 350 may protrude from the reflection layer 320 toward the display panel 10.

Each of the plurality of reflectors 350 is disposed in the front direction (+Z axis direction) of the light source package 210. Also, each of the plurality of reflectors 350 may be disposed to be spaced a predetermined distance from the light source package 210 in the traveling direction of the light at the front side (+Z axis direction) of the light source package 210.

Here, as illustrated in FIG. 10, the plurality of reflectors 350 may be disposed with density that gradually increases in a direction that is away from the light source unit 200. That is to say, a distance between the reflectors 350, which are adjacent to each other in the traveling direction of the light emitted from the light source unit 200 may decrease in the direction that is away from the light source unit 200.

The plurality of reflectors 350 may further protrude toward the display panel 10 in the direction that is away from the light source unit 200. The plurality of reflectors 350 may have an inclined angle that gradually increases in the direction that is away from the light source unit 200. Here, the inclined angle may represent an angle that is inclined from the bottom cover 30 toward the display panel 10. The light emitted from the light source unit 200 may be effectively reflected toward the display panel 10 due to the above-described arrangement and shape even though the reflectors 350 are away from the light source unit 200.

The plurality of reflectors 350 may have an embossed shape and may be manufactured by using an imprinting process. Particularly, the plurality of reflectors 350 may have a prism shape. Here, each of the plurality of reflectors 350 may have a height h of at least 50 um or more. That is, each of the reflectors 350 may have a minimum height h of about 50 um. In the current embodiment, the height h of the reflector may represent a protruding height h of the first reflector 350 that is disposed right ahead of the light source unit 200.

As illustrated in FIG. 7, each of the reflectors 350 may include an inclined surface 360 and a support surface 370. The inclined surface 360 extends from a surface of the reflection layer 320 and is disposed in a direction (−Z axis direction) that faces the light source unit 200. The light emitted from the light source unit 200 may be reflected toward the display panel 10 by the inclined surface 360 of the reflector 350. Also, the inclined surface 360 may have an inclined angle that gradually increases in the direction that is away from the light source unit 200. This is done for more increasing light reflection efficiency as described above.

Both ends 362 and 366 of the inclined surface 360 may be rounded. That is to say, one end 362 of the titled surface 360, i.e., a protruding end 362 of the reflector 350 may be rounded. This is done for smoothly scattering fight to realize the optimum image quality and for preventing scratches that occurs when the reflection sheet 300 is treated from occurring. Also, the end 366 at which the inclined surface 360 starts may also be smoothly rounded with a predetermined curvature to improve the reflection efficiency.

The support surface 370 may be a surface connecting the protruding end 362 of the inclined surface 360 to the reflection layer 320. The support surface 370 may be perpendicular to the reflection layer 320 or inclined at an angle of about 90 degree or less with respect to the reflection layer 320.

At least one optical sheet 400 may be disposed between the display panel 10 and the reflection sheet 300 to uniformly diffuse the light reflected by the reflection sheet 300, thereby improving brightness. The optical sheet 400 may be provided as one or more. The optical sheet 400 may include a prism sheet 410 and a diffusion sheet 460. In detail, the prism sheet 410 may be an optical sheet for improving the brightness, and the diffusion sheet 460 may be an optical sheet for diffusing light to realize uniform color and brightness.

As illustrated in FIG. 8, a bottom surface 465 of the diffusion sheet 460 may have a Lenti shape to improve light collection efficiency. In the Lenti shape, process costs may be reduced when compared to the irregularly embossed shape. Thus, manufacturing costs of the display apparatus 1 may be significantly reduced.

The support 500 may be a unit for supporting the plurality of optical sheets 400 and coated with a white or transparent resin. Particularly, the support 500 may support the diffusion sheet 460 so that the diffusion sheet 460 does not droop to the reflection sheet 300 to constantly maintain an optical gap g between the reflection sheet 300 and the diffusion sheet 460. In general, since the optical gap g of at least 25 um or more realizes the optimum image quality, a height of the support 500 may be designed in consideration of the optical gap g in the current embodiment.

As illustrated in FIG. 9, an end 510 of the support 500, which contacts a bottom surface of the diffusion sheet 460 may be rounded. This is done for preventing the surface of the diffusion sheet 460 from being damaged by the contact between the end 510 of the support 500 and the diffusion sheet 460.

Figure 11:
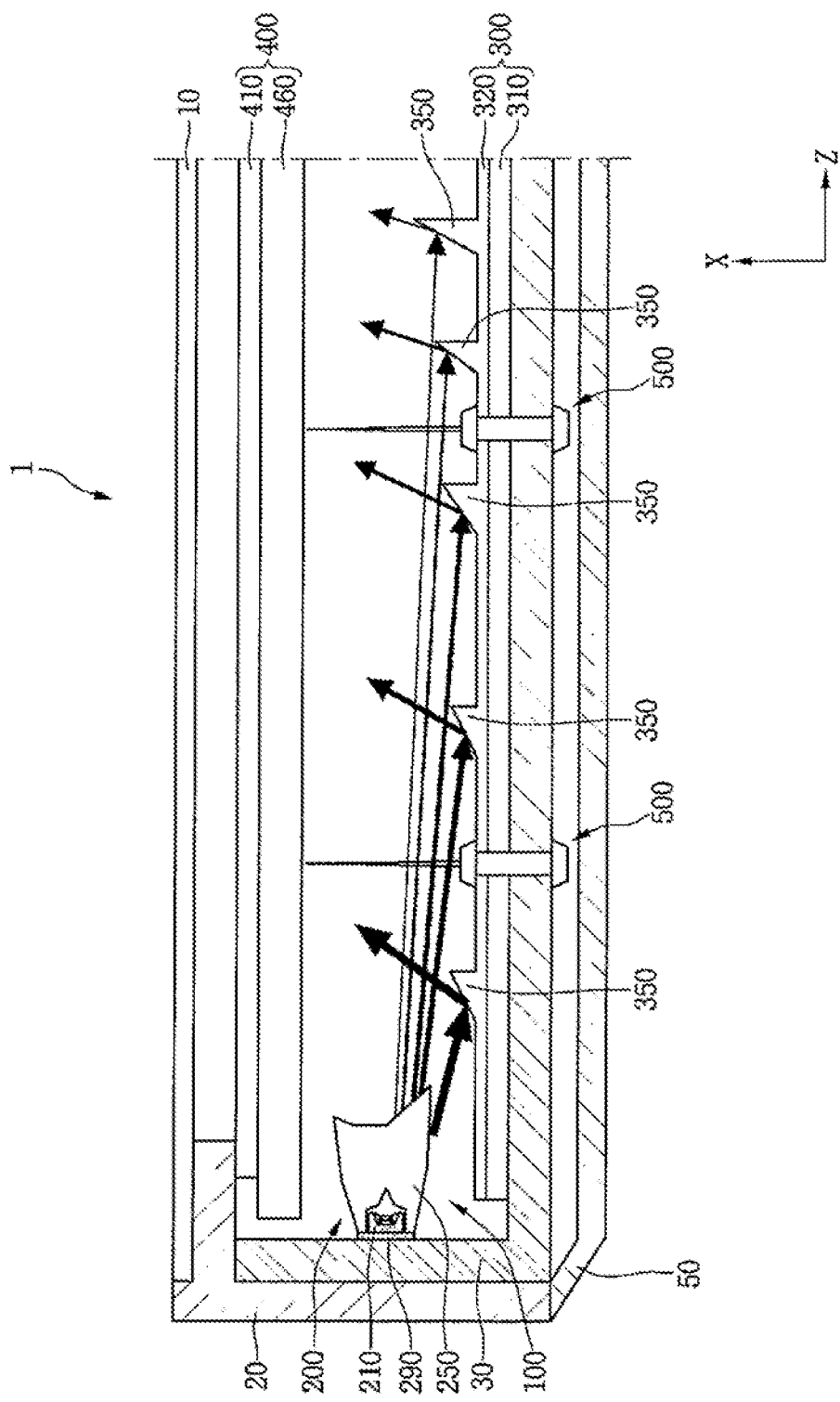
FIG. 11 is a view for explaining an operation of the display apparatus of FIG. 2.

Hereinafter, an operation of the display apparatus 1 according to the current embodiment will be described. FIG. 11 is a view for explaining an operation of the display apparatus of FIG. 2. Referring to FIG. 11, when light is emitted from the light source package 210 mounted on one surface of the display apparatus 1, the optical lens 250 may guide the light emitted from the light source package 210 so that the light maximally moves up to the other surface of the display apparatus 1.

Particularly, as described above, a first lens part 253 of the optical lens 250 may induce the emitted light toward the reflection sheet 300, and a second lens part 255 of the optical lens 250 may induce the light so that the light advances in the front direction (+Z axis direction) of the light source package 210. Thereafter, the light induced toward the reflection sheet 300 may be reflected to the display panel 10 by the plurality of reflectors 350 disposed on the reflection layer 320. As described above, even though each of the reflectors 350 is away from the light source unit 200, the reduction in reflection efficiency of the reflector 350 may be prevented by the arrangement and shape of the reflector 350.

Thus, in the display apparatus 1 according to the current embodiment, light may be uniformly reflected from the edge type backlight unit 100 to the display panel 10 without providing the light guide plate through the optical lens 250 having the asymmetric shape and the plurality of reflectors 350 disposed on the reflection sheet 300. As a result, the light may be uniformly supplied toward the display panel 10. Therefore, in the display apparatus 1 according to the current embodiment, since the light guide plate is not required in the edge type backlight unit 100, the display apparatus 1 that is slimmer and lighter than that of the display apparatus according to the related art may be manufactured. Furthermore, in the display apparatus 1 according to the current embodiment, the light may be uniformly supplied toward the display panel through the above-described components even though the light guide plate is removed from the backlight unit 100 to realize the optimum image quality.

Figure 12:
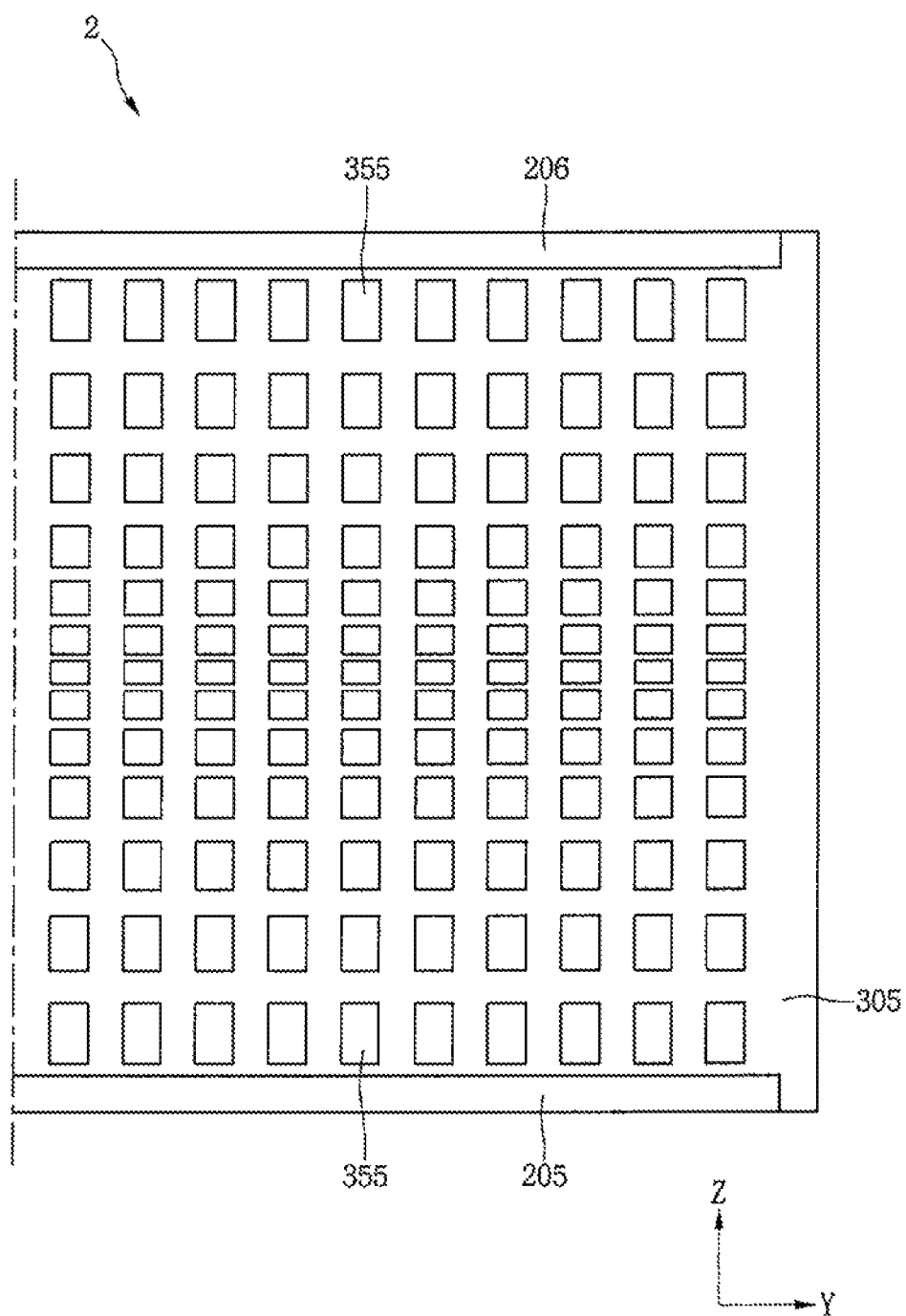
FIG. 12 is a plan view for explaining a main part of a display apparatus according to another embodiment.

FIG. 12 is a plan view for explaining a main part of a display apparatus according to another embodiment. Since a display apparatus 2 according to the current embodiment is substantially similar to the display apparatus 1 according to the forgoing embodiment, the duplicated description with respect to the same constitutions will be omitted, and thus different points therebetween will be mainly described.

Referring to FIG. 12, the display apparatus 2 according to the current embodiment includes light source units 205 and 206 on both side surfaces of the display apparatus 2, i.e., both side surfaces facing each other of a bottom cover. That is, the display apparatus 2 according to the current embodiment includes the light source units 205 and 206 on each of both side surfaces (side surfaces facing each other) within the display apparatus 2, unlike the display apparatus 1 according to the foregoing embodiment.

Thus, in the current embodiment, the plurality of reflectors 355 disposed on a reflection sheet 305 may be disposed with density that gradually increases toward a central portion thereof. Also, each of the reflectors 355 may further protrude toward the display panel and have a more inclined angle. Thus, the display apparatus 2 according to the current embodiment may also realize the optimum image quality without providing the light guide plate, like the foregoing embodiment.

Figure 13:
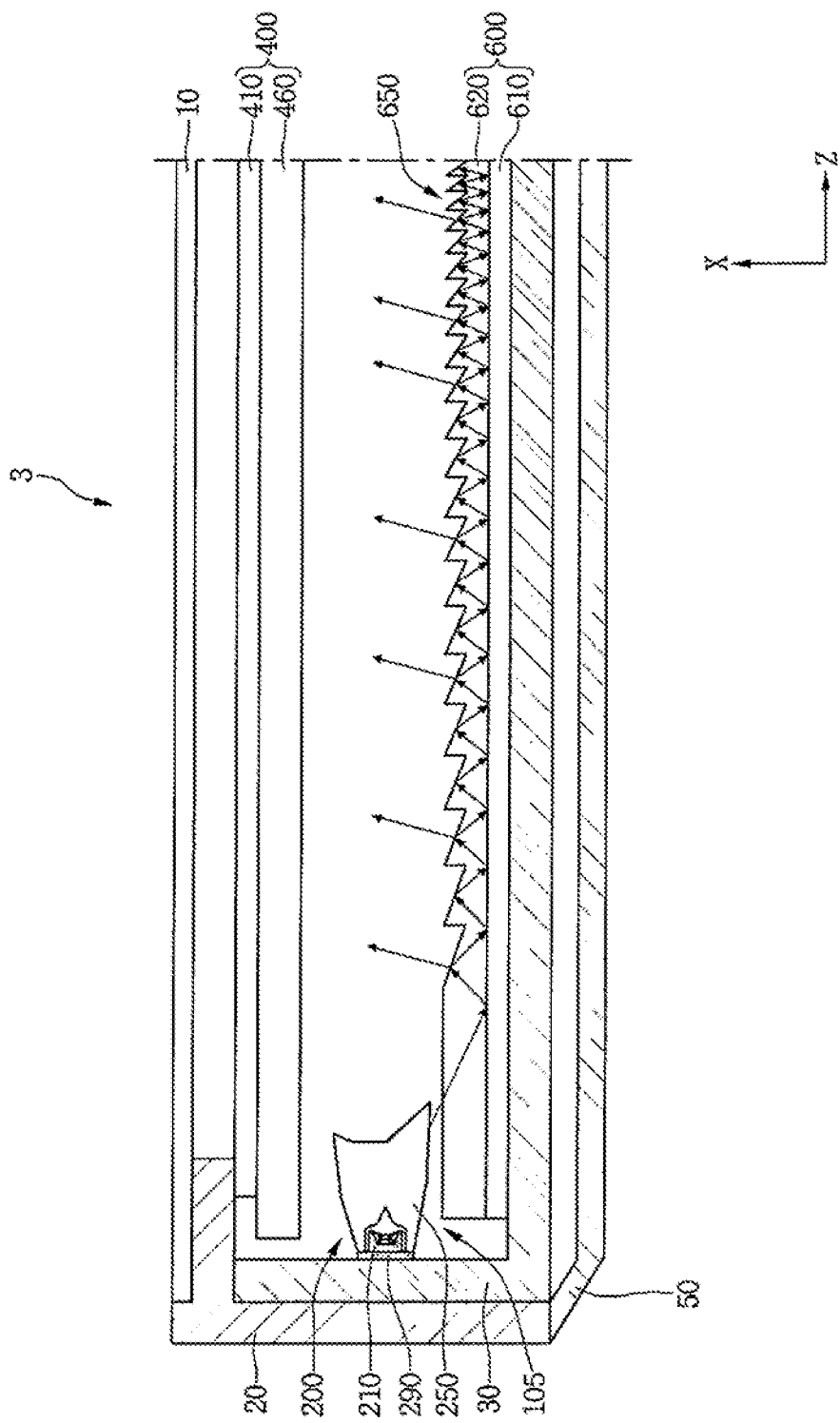
FIG. 13 is a cross-sectional view of a display apparatus according to further another embodiment.
Figure 14:
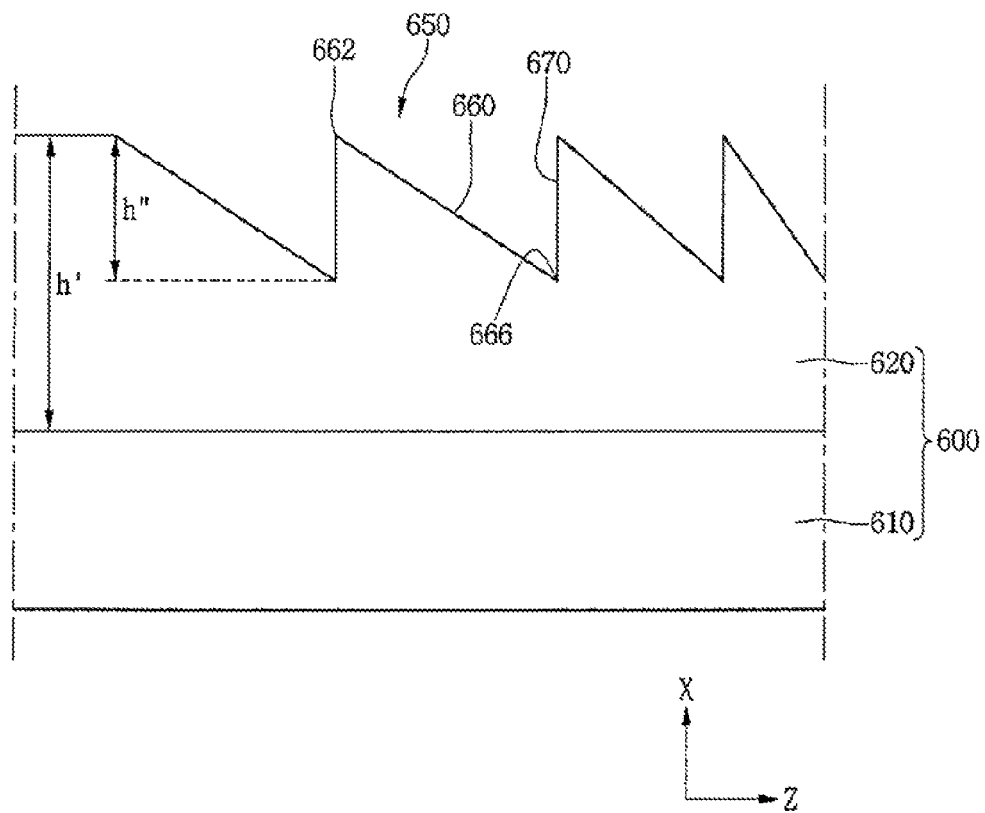
FIG. 14 is an enlarged view illustrating a main part of the display apparatus of FIG. 13.
Figure 15:
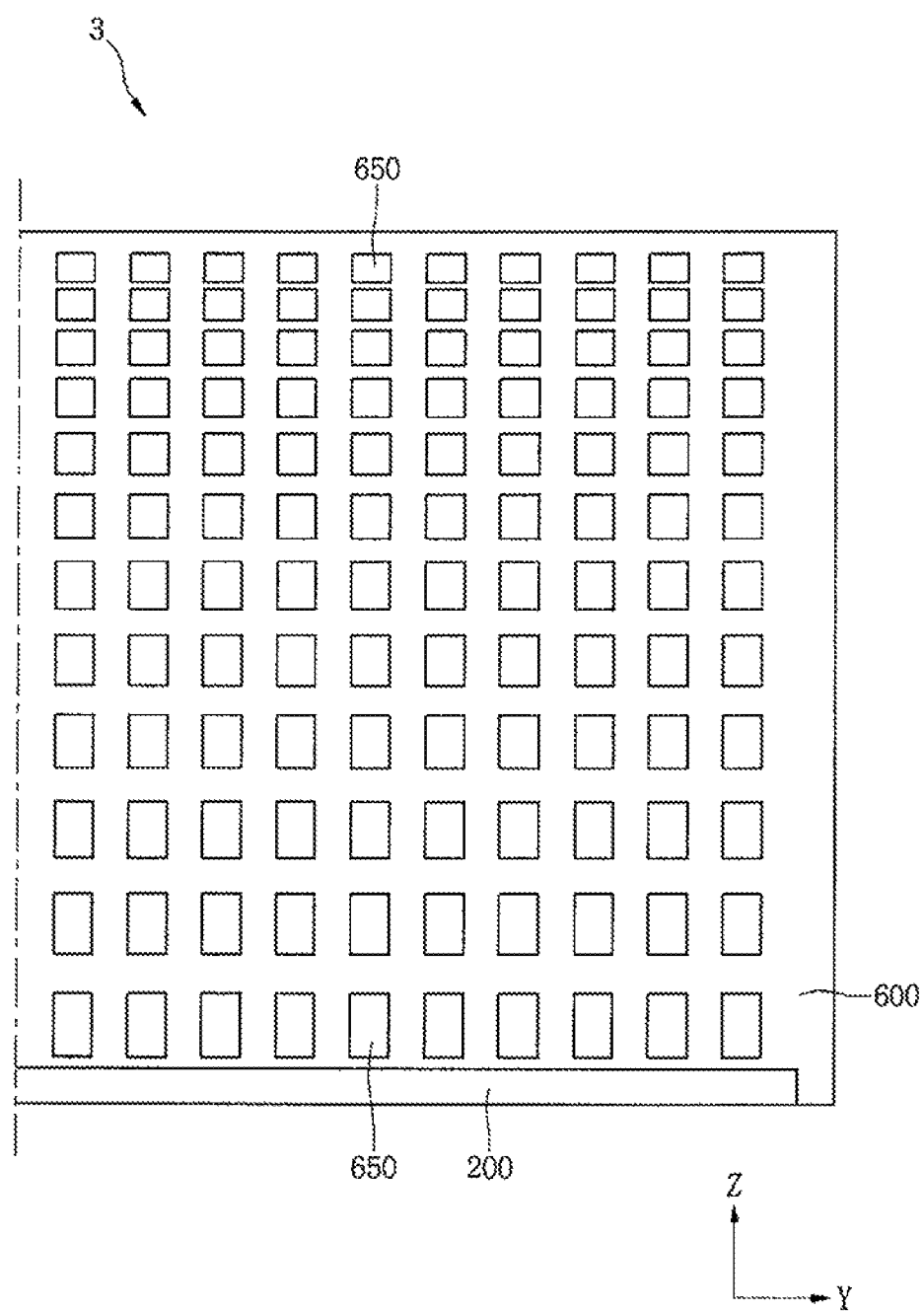
FIG. 15 is a plan view for explaining a main part of the display apparatus of FIG. 13.

FIG. 13 is a cross-sectional view of a display apparatus according to further another embodiment, FIG. 14 is an enlarged view illustrating a main part of the display apparatus of FIG. 13, and FIG. 15 is a plan view for explaining a main part of the display apparatus of FIG. 13. Since a display apparatus 3 according to the current embodiment are substantially similar to the display apparatus 1 according to the forgoing embodiment, the duplicated description with respect to the same constitutions will be omitted, and thus different points therebetween will be mainly described.

Referring to FIGS. 13 to 15, a display apparatus 3 according to the current embodiment includes a display panel 10, a top cover 20, a bottom cover 30, a back cover 50, and a backlight unit 105. Since the display module 10, the top cover 20, the bottom cover 30, and the back cover 50 are the same as those according to the foregoing embodiments, their duplicated descriptions will be omitted. The backlight unit 105 may include a light source unit 200, an optical sheet 400, a support 500 and a reflection sheet 600. Since the light source unit 200 is the same as those according to the foregoing embodiments, its duplicated description will be omitted. The optical sheet 400 may include a prism sheet 410 and a diffusion sheet 460. Since the optical sheet 400 is the same as those of the foregoing embodiments, its duplicated description will be omitted. Since the support 500 is the same as those according to the foregoing embodiments, its duplicated description will be omitted.

The reflection sheet 600 may include a sheet base 610 and a reflection layer 620. Since the reflection sheet 600 is the same as those of the foregoing embodiments, its duplicated description will be omitted. The reflection layer 620 may be formed of a transparent resin having high reflectivity. The transparent resin may be a medium through which light is reflected and may have high reflectivity. The reflection layer 620 formed of the transparent resin may be applied to a top surface of the sheet base 610.

A plurality of reflectors 650 are disposed on the reflection layer 620 to protrude from the reflection layer 620 toward the display panel 10. The plurality of reflectors 650 may be disposed with density that gradually increases in the direction that is away from the light source unit 200. Also, the plurality of reflectors 650 may have an inclined angle that gradually increases in the direction that is away from the light source unit 200. The light emitted from the light source unit 200 may be effectively reflected toward the display panel 10 due to the above-described arrangement and shape even though the reflectors 350 are away from the light source unit 200. The plurality of reflectors 650 may have an engraved shape and may be manufactured by using an imprinting process. Particularly, the plurality of reflectors 650 may have a prism shape.

A thickness h' of the reflection layer 620 and a protruding height h" of the reflector 650 may be defined within a numerical range in which an internal reflection effect is maximized. In the current embodiment, the reflection layer 620 may have a thickness h' of at least 200 um or more, and each of the reflectors 650 may have a height h" of at least 50 um. In the current embodiment, the plurality of reflectors 650 may have a uniform protruding height h". Here, the protruding height h" may be defined as an "engraved depth" or "recessed depth" of the reflection layer 620 for forming the reflectors 650.

Each of the reflectors 650 may include an inclined surface 660 and a support surface 670. The inclined surface 660 may extend to be inclined downward from a top surface of the reflection layer 620, and the support surface 670 may connect a lower end 666 of the inclined surface 660 to the reflection layer 620. The lower end 666 of the inclined surface 660 may be defined as a "recessed end".

Also, the reflection sheet 600 according to the current embodiment may include a reflection layer 620 on which reflectors 650 each of which has an engraved shape formed of a transparent resin and a sheet base 610 disposed on a bottom surface of the reflection layer 620 and formed of a white resin. Thus, the light emitted from the light source unit 200 may transmit the reflection layer 620 and is reflected by the sheet base 610 and then irradiated onto the inclined surface 660. Also, a portion of the light irradiated onto the inclined surface 660 may be refracted toward the display panel, and the other portion of the light may be irradiated again onto the sheet base 610.

The inclined surface 660 may have an inclined angle that gradually increases in a direction that is away from the light source unit 200. This is done for more increasing light supply efficiency in the direction of the display panel 10. Also, each of both ends 662 and 666 of the inclined surface 660 may be tapered. That is to say, one end 662 of the inclined surface 660, i.e., a protruding end 662 of the reflector 650 may be tapered. This is done because the light supply efficiency in the direction of the display panel 10 increases when the end of the inclined surface 660 is tapered in the reflector 650 having the engraved shape.

The support surface 670 may be a surface connecting the protruding end of the inclined surface 660 to the reflection layer 610. The support surface 670 may be perpendicular to or inclined with respect to the sheet base 610.

As illustrated in FIG. 14, a distance between lower ends (or recessed ends) of the reflectors 650 that are engraved (recessed) in the traveling direction of the light may decrease in a direction that is away from the light source unit 200. As described above, the light may be uniformly supplied from the edge type backlight unit 105 toward the display panel 10 through the plurality of reflectors 650 without providing the light guide plate such as the plurality of reflectors each of which has the embossed shape.

Figure 16:
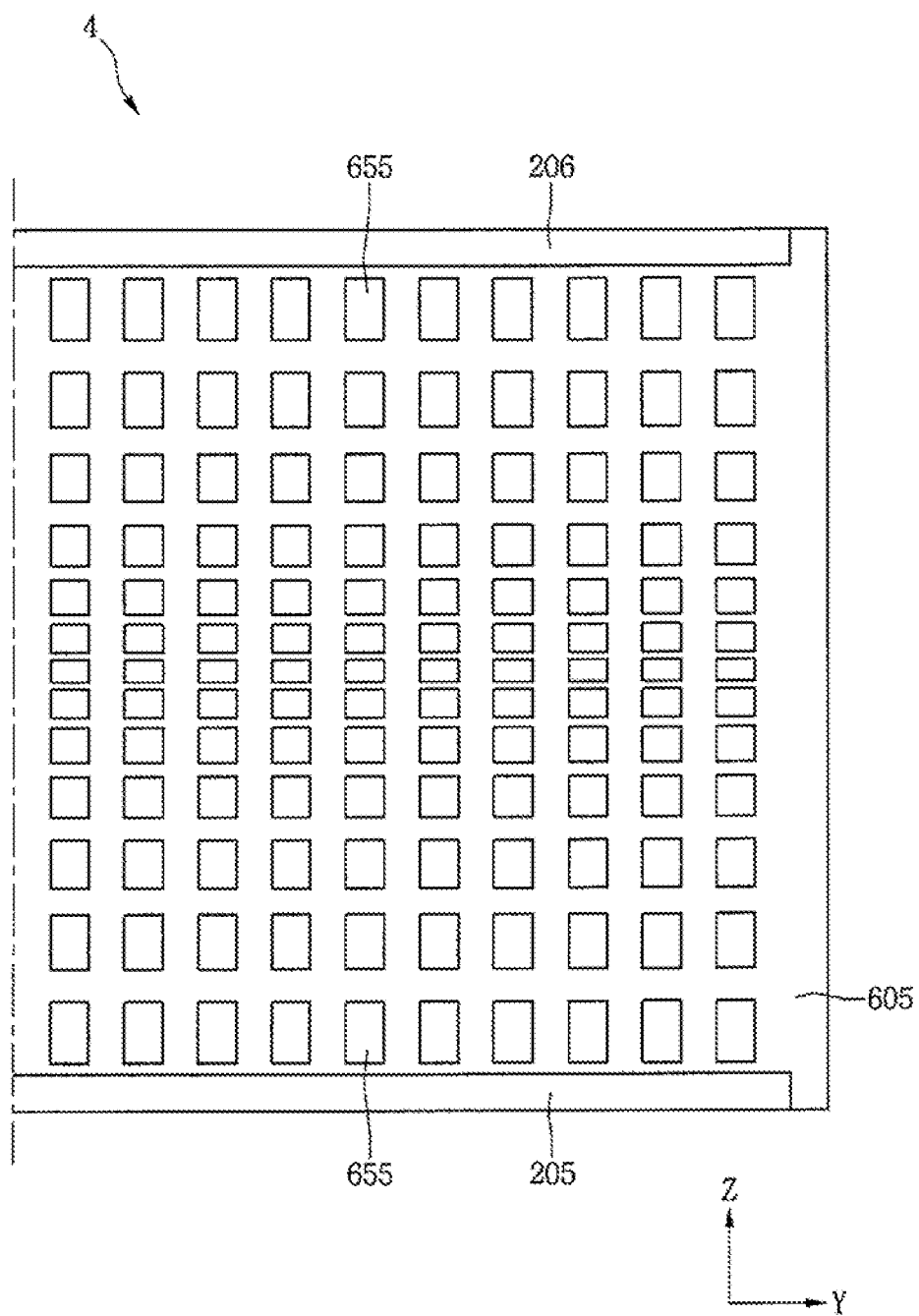
FIG. 16 is a plan view for explaining a main part of a display apparatus according to another embodiment.

FIG. 16 is a plan view for explaining a main part of a display apparatus according to another embodiment. In a display apparatus 4 according to the current embodiment, a reflector 655 may have the same shape as the reflector illustrated in FIGS. 13 and 14, and light source units 205 and 206 may be disposed on both side surfaces of a bottom cover as illustrated in FIG. 12.

Figure 17:
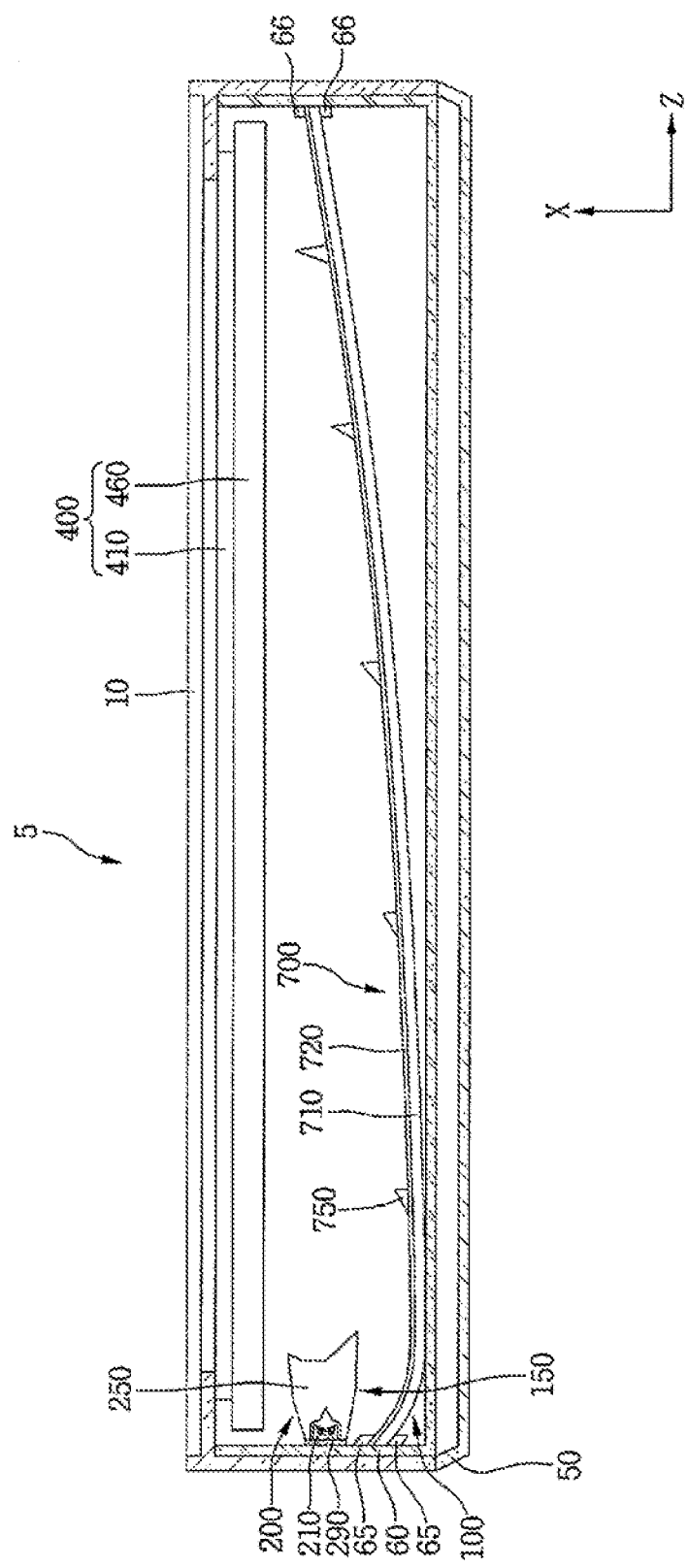
FIG. 17 is a cross-sectional view of a display apparatus according to another embodiment.

FIG. 17 is a cross-sectional view of a display apparatus according to further another embodiment. Since a display apparatus 5 according to the current embodiment is substantially similar to the display apparatus 1 according to the forgoing embodiment, the duplicated description with respect to the same constitutions will be omitted, and thus different points therebetween will be mainly described.

Referring to FIG. 17, a display apparatus 5 according to the current embodiment includes a display panel 10, a top cover 20, a back cover 50, a bottom cover 60, and a backlight unit 150. A reflection sheet 700 constituting the backlight unit 150 may be rounded as illustrated in FIG. 17.

The reflection sheet 700 may have one end fixed to one side surface of the bottom cover 60 on which an optical unit 200 is mounted and the other end fixed to a side surface of the bottom cover 60 facing that on which the optical unit 200 is mounted. Reflection sheet fixing parts 65 and 66 for fixing both ends of the reflection sheet 700 may be disposed on both side surfaces of the bottom cover 60. The reflection sheet fixing parts 65 and 66 may include a first fixing part 65 and a second fixing part 66.

The first fixing part 65 may be disposed under the light source unit 200 to fix one end of the reflection sheet 700. The first fixing part 65 may include a pair of protrusion ribs that are closely attached to top and bottom surfaces of the reflection sheet 700 so that the end of the reflection sheet 700 is inserted and supported. Here, the first fixing part 65 may be integrated with the bottom cover 60 or may be fixed and mounted to one side surface of the bottom cover.

The second fixing part 66 may be disposed on the other side surface of the bottom cover 60, i.e., an opposite side surface on which the light source unit 200 is not disposed. The second fixing part 66 may have the same shape as the first fixing part. The second fixing part 66 may be disposed on the bottom cover 60 by using the same method as the above-described method.

According to the above-described structure, both ends of the reflection sheet 700 may be spaced a predetermined distance upward from the bottom of the bottom cover 60. The reflection sheet 700 may have a curved shape that contacts the bottom surface of the bottom cover 60 at a predetermined disposition. A height from the bottom surface of the bottom cover 60 to the other end of the reflection sheet 700 may be greater than that from the bottom surface of the bottom cover 60 to one end of the reflection sheet 700. Thus, the reflection sheet 700 may be mounted on the bottom cover 60 in a shape that is rounded in a direction that is close to the bottom surface of the bottom cover 60 from one end, and then, rounded in a direction that is away from the bottom surface of the bottom cover 60 from the contact point with the bottom cover 60. The point at which the bottom cover 60 and the reflection sheet 700 contact each other may be closer to the one end than the other end of the reflection sheet 700. That is, the reflection sheet 700 and the bottom cover 60 may contact each other at the point that is closer to the light source unit 200.

The reflection sheet 700 may include a sheet base 710, a reflection layer 720, and a plurality of reflectors 750, like the foregoing embodiments. The plurality of reflectors 750 may have an embossed or engraved shape, like the foregoing embodiment. The further the reflectors are away from the light source unit 200, the more a distance between the reflectors adjacent to each other may decrease.

When the light source unit 200 is disposed on each of both side surfaces of the bottom cover 60, the distance between the reflectors adjacent to each other may decrease in a direction from both ends to a central portion of the reflector 750. The more the reflector is away from the light source unit 200, the more the reflector 750 increase in protruding height and inclined angle.

FIG. 18 is a cross-sectional view of a display apparatus according to further another embodiment. A display apparatus 6 according to the current embodiment may be the same as the display apparatus 5 of FIG. 17 except for a structure of a bottom surface part of a bottom cover 70.

The bottom cover 70 according to the current embodiment is the same as the bottom cover of FIG. 17 in that the bottom cover 70 includes a pair of reflection sheet fixing parts 75 and 76. However, the current embodiment is different from the foregoing embodiment that is described with reference to FIG. 17 in that a plurality of reflection sheet supports 77 are disposed on a bottom surface of the bottom cover 70.

The plurality of reflection sheet supports 77 may support a reflection sheet 700 that will be described below and be disposed on the bottom surface of the bottom cover 70. Also, the plurality of reflection sheet supports 77 may be disposed to be spaced a predetermined distance from each other. The whole size of the reflection sheet supports 77, which includes a protruding height of each of the reflection sheet supports 77, may increase in a direction that is away from the light source unit 200. The increases in protruding height of the reflection sheet support 77 in the direction that is away from the light source unit 200 may be because a distance spaced from the bottom cover 70 gradually increases to the other end of the reflection sheet 700.

The plurality of reflection sheet supports 77 may be manufactured through a forming process. Although each of the plurality of reflection sheet supports 77 has a circular section, the present disclosure is not limited thereto.

In the backlight unit and the display apparatus including the same according to the embodiments, the light irradiated from the side surface of the display panel may be effectively diffused without providing the light guide plate to realize the uniform brightness. The optimum image quality may be realized due to the uniform brightness.

Embodiments provide a slimmer edge type backlight unit that is capable of realizing optimum image quality without providing a light guide plate according to the latest slimness trend and a display apparatus including the same.

In one embodiment, a backlight unit includes: an optical sheet disposed below a display panel to uniformly diffuse light incident into the display panel; at least one light source unit disposed at one side edge portion of and below the optical sheet, the at least one light source unit having a light irradiation surface that faces the other side edge portion of the optical sheet; and a reflection sheet disposed to be spaced a predetermined distance downward from the optical sheet to reflect the light emitted from the at least one light source unit toward the optical sheet, wherein the at least one light source unit comprises: a light source package disposed between the optical sheet and the reflection sheet; and an optical lens surrounding the light source package at a side of the light irradiation surface of the light source package, wherein the optical lens is vertically asymmetrical with respect to a surface that is parallel to the optical sheet and bisectionally divides the light source package.

The details of one or more embodiments are set forth in the accompanying drawings and the description. Other features will be apparent from the description and drawings, and from the claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   an optical sheet;
   a reflection sheet below the optical sheet, wherein the reflection sheet includes a reflection layer; and
   at least one light source configured to emit light toward a space between the optical sheet and the reflection sheet, the at least one light source including a light source package on a surface and an optical lens over the light source package,
   wherein the reflection sheet includes a plurality of reflectors extending from the reflection layer toward the optical sheet to reflect light from the light source package toward the optical sheet,
   wherein each reflector includes:
      an inclined surface that is inclined with respect to the reflection layer to reflect light from the light source package toward the optical sheet; and
      a support surface,
      wherein the plurality of reflectors includes a first reflector, second reflector, and a third reflector provided in a sequential order along the reflection layer, wherein the inclined surface of the third reflector steeper than the inclined surface of the second reflector, and the inclined surface of the second reflector is steeper than the inclined surface of the first reflector,
   wherein the optical lens has an asymmetrical shape with respect to a place that bisectionally divides the light source package,
   wherein the plane is parallel to the optical sheet or the reflection sheet, and
   wherein the optical lens includes:
      a first lens part having a first side and a first end; and
      a second lens part having a second side and a second end, the second end of the second lens part being closer to the reflection sheet than the first end of the first lens part, wherein the second end of the second lens part is further from the surface than the first end of the first lens part.

2. The backlight unit according to claim 1, wherein a distance between the third reflector and the second reflector is less than a distance between the second reflector and the first reflector.

3. The backlight unit according to claim 1, wherein the support surface is a back surface, and wherein a height of the third reflector is greater than a height of the second reflector, and the height of the second reflector is greater than a height of the first reflector.

4. The backlight unit according to claim 3, wherein the height of the first reflector is at least 50 nm.

5. The backlight unit according to claim 1, wherein the reflector is smoothly rounded.

6. The backlight unit according to claim 1, wherein the reflection sheet is curved between each of the plurality of reflectors and the reflection layer.

7. The backlight unit according to claim 1, wherein the reflection sheet is formed of a white resin material.

8. A backlight unit comprising:
   an optical sheet;
   a reflection sheet below the optical sheet, wherein the reflection sheet includes a reflection layer; and
   at least one light source configured to emit light toward a space between the optical sheet and the reflection sheet, the at least one light source including a light source package on a surface and an optical lens over the light source package,
   wherein the reflection sheet includes a plurality of recesses to reflect light from the light source package toward the optical sheet,
   wherein each recess includes:
      an inclined surface that is inclined with respect to the reflection layer; and
      a support surface connecting an end of the inclined surface to a surface of the reflection layer,
      wherein the plurality of recesses includes a first recess, a second recess, and a third recess, wherein the inclined surface of the third recess is steeper than the inclined surface of the second recess, and the inclined surface of the second recess is steeper than the inclined surface of the first recess,
   wherein the optical lens has an asymmetrical shape with respect to a plane that bisectionally divides the light source package,
   wherein the plane is parallel to the optical sheet or the reflection sheet, and
   wherein the optical lens includes:
      a first lens part having a first side and a first end; and
      a second lens part having a second side and a second end, the second end of the second lens part being closer to the reflection sheet than the first end of the first lens part, wherein the second end of the second lens part is further from the surface than the first end of the first lens part.

9. The backlight unit according to claim 8, wherein the plurality of recesses have a same recessed depth.

10. The backlight unit according to claim 8, wherein the reflection layer is formed of a transparent resin, and the reflection sheet includes a sheet base formed of a white resin.

11. The backlight unit according to claim 10, wherein light from the light source package penetrates the reflection layer and is reflected at the sheet base toward the inclined surface of one of the recesses, and a first portion of the light at the inclined surface is directed toward the optical sheet, and a second portion of the light is directed toward the sheet base.

12. The backlight unit according to claim 10, wherein the reflection layer has a thickness of at least 200 um, and each recess has a recessed depth of at least 50 um.

13. A display apparatus comprising:
a bottom cover including:
a bottom part; and
first and second side surface parts that are respectively bent upward from both ends of the bottom part;
a display panel on upper ends of the first and second side surface parts of the bottom cover; and
the backlight unit according to claim 1, the backlight unit being between the bottom cover and the display panel.

14. The display apparatus according to claim 13, wherein the light source is at the first side surface part to provide light towards the second side surface part.

15. The display apparatus according to claim 13, wherein the reflection sheet includes:
a first end at a first point of the first side surface part; and
a second end at a second point of the second side surface part, wherein a contact portion of the reflection sheet contacts the bottom cover, and wherein a distance between the second point and the bottom cover is greater than a distance between the first point and the bottom cover.

16. The display apparatus according to claim 15, wherein the reflection sheer is curved between the first end and the second end, and the contact portion of the reflection sheet is closer to the first side surface part than the second side surface part.

17. The backlight unit according to claim 1, wherein the third reflector is located farther from the light source than the second reflector, and the second reflector is located farther from the light source than the first reflector.

18. The backlight unit according to claim 17, wherein the inclined surface faces the light source.

* * * * *